No. 780,464.

Patented January 17, 1905.

UNITED STATES PATENT OFFICE.

UTLEY WEDGE, OF ARDMORE, PENNSYLVANIA.

IRON-PYRITES BRIQUET AND MODE OF MAKING SAME.

SPECIFICATION forming part of Letters Patent No. 780,464, dated January 17, 1905.

Application filed March 29, 1904. Serial No. 200,655.

*To all whom it may concern:*

Be it known that I, UTLEY WEDGE, a citizen of the United States, residing in Ardmore, Pennsylvania, have invented certain Improvements in Iron-Pyrites Briquets and Modes of Making Same, of which the following is a specification.

This invention consists of an improvement in or modification of the method of preparing relatively fine particles of iron pyrites for desulfurization which formed the subject of my Letters Patent No. 757,531, dated April 19, 1904, the object of my present invention being to simplify the carrying out of the process forming the subject of said prior application.

The invention forming the subject of my former application consisted in forming the relatively fine particles of iron pyrites, commonly termed "pyrites fines" or "pyrites smalls," into blocks or briquets by combining them with sulfate of iron and then pressing the mass into the desired form, the purpose being to produce blocks or briquets which were so hard and offered such resistance to disintegration that they could be conveniently handled and treated in the same manner as the rock ore, the binding ingredient importing into the block or briquet no foreign element which would interfere with the free elimination of the sulfur therefrom or so adulterate the sulfurous-acid gas as to retard or prevent the subsequent conversion of the same into sulfuric acid. In carrying out the former invention the fine particles of pyrites were mixed with sulfate of iron, preferably the impure sulfate of iron resulting as a byproduct in the manufacture of sulfuric acid, or they were mixed with oxid of iron and sulfuric acid, or both of these plans were adopted.

If iron pyrites is reduced to a powder and mixed with sufficient water to render it plastic or of a pasty consistency, it will when subjected to the air, and especially when under the further influence of heat, rapidly oxidize and produce a sulfate of iron, which constitutes an effective bond or binder for the particles of pyrites of which the desired blocks or briquets are to be formed, and in carrying out my present invention I produce the sulfate-of-iron bond or binder for the block or briquet in this manner. The pyrites may be ground with water in a suitable mill, or it may first be ground dry and then ground or otherwise mixed with the water to produce a plastic or pasty compound, which is combined with the particles of pyrites to be briqueted, the chemical change due to the oxidation of the pyrites taking place in the block or briquet after the formation of the same, or the plastic mass of powdered pyrites and water may be subjected to the action of the air and preferably also to heat until the chemical change has been effected in whole or in part and sulfate of iron has been produced, and the resulting product containing sulfate of iron may then be mixed with the particles of pyrites prior to the briqueting of the same. The amount of sulfate of iron employed need only be sufficient to render the whole mass sufficiently plastic to permit it to be molded into the desired shape and its particles sufficiently adherent to retain this shape when molded and dried or baked.

I am aware that it has been customary prior to my invention to grind pyrites fines with water in a suitable mill until a homogeneous mixture similar to fine mortar has been formed and then to subject the mass to the action of air and also to heat until it forms a cake which can be broken into lumps susceptible of being handled in the desulfurizing-furnace; but my invention is distinct from this in that instead of reducing the entire tonnage of pyrites fines or pyrites smalls to the powdered form I only reduce sufficient of the same to form an amount of bond or binder necessary for admixture with the remaining pyrites fines or pyrites smalls in order to permit the molding of the latter into the desired blocks or briquets, thereby not only saving time and labor, but reducing the excessive wear upon the mills employed for grinding the pyrites.

Although on the score of convenience and economy water is always preferred for admixture with the powdered pyrites, dilute acid, such as sulfuric or hydrochloric acid, may be used instead of water, if desired, and in some cases the pyrites fines or pyrites smalls may contain powdered pyrites in such quantity as to provide sufficient sulfate of iron to act as a bond or binder for the blocks or briquets, if the mass is properly moistened and then exposed to the atmosphere and to heat in order to effect the oxidation of the pyrites-powder, such oxidation being effected either before or after the molding or pressing of the block or briquet, and in such case of course the addition of a further quantity of powdered pyrites will be unnecessary.

When the pyrites is of a cuprous character, the oxidation of the powdered pyrites will result in the production of sulfate of copper as well as sulfate of iron; but the presence of such sulfate of copper does not detract from the bonding quality of the oxidized-pyrites powder, as the sulfate of copper has a bonding action similar to that of the sulfate of iron, and the same may be said of sulfate of zinc. Hence the presence of zinc in the pyrites does not interfere with the proper carrying out of my invention, and the latter may therefore be held to include the bonding together of the pyrites fines or pyrites smalls by the use of any sulfate or combination of sulfates resulting from the oxidation of powdered pyrites.

Having thus described my invention, I claim and desire to secure by Letters Patent—

1. The mode herein described of preparing "pyrites fines" or "pyrites smalls" for desulfurization, said mode consisting in moistening powdered pyrites, mixing the "pyrites fines" or "pyrites smalls" therewith, and forming the mass into blocks or briquets, substantially as specified.

2. The mode herein described of preparing "pyrites fines" or "pyrites smalls" for desulfurization, said mode consisting in moistening powdered pyrites, mixing the "pyrites fines" or "pyrites smalls" therewith, forming the mass into blocks or briquets, and then subjecting the same to the action of the air, substantially as specified.

3. The mode herein described of preparing "pyrites fines" or "pyrites smalls" for desulfurization, said mode consisting in moistening powdered pyrites, mixing the "pyrites fines" or "pyrites smalls" therewith, forming the mass into blocks or briquets, and then subjecting the same to the action of the air and to heat, substantially as specified.

4. The mode herein described of preparing "pyrites fines" or "pyrites smalls" for desulfurization, said mode consisting in binding them into blocks or briquets by means of sulfate or sulfates produced by the oxidation of powdered pyrites, substantially as specified.

5. The mode herein described of preparing "pyrites fines" or "pyrites smalls" for desulfurization, said mode consisting in binding them into blocks or briquets by means of sulfate or sulfates produced by the action of air and heat upon powdered pyrites, substantially as specified.

6. As a new article of manufacture, a block or briquet composed of "pyrites fines" or "pyrites smalls" bonded by means of sulfate or sulfates resulting from the oxidation of powdered pyrites, substantially as specified.

In testimony whereof I have signed my name to this specification in the presence of two subscribing witnesses.

UTLEY WEDGE.

Witnesses:
 JAMES McMORRIS,
 JOS. H. KLEIN.